(12) United States Patent
Bennett et al.

(10) Patent No.: US 8,392,390 B2
(45) Date of Patent: Mar. 5, 2013

(54) ASSISTED CONTENT AUTHORING

(75) Inventors: Eric Paul Bennett, Bellevue, WA (US); Matthew Bret MacLaurin, Woodinville, WA (US); Christian James Colando, Seattle, WA (US); Scott V. Fynn, Seattle, WA (US); Blaise H. Aguera y Arcas, Seattle, WA (US); Eric S. Anderson, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 263 days.

(21) Appl. No.: 12/790,359

(22) Filed: May 28, 2010

(65) Prior Publication Data

US 2011/0295878 A1    Dec. 1, 2011

(51) Int. Cl.
G06F 7/00 (2006.01)
G06F 17/30 (2006.01)
(52) U.S. Cl. ......... 707/705; 707/722; 707/726; 707/769
(58) Field of Classification Search ............... 707/769, 707/771, 705, 708, 722, 726, 729
See application file for complete search history.

(56) References Cited

U.S. PATENT DOCUMENTS

| | | | |
|---|---|---|---|
| 5,371,673 A * | 12/1994 | Fan | 704/1 |
| 5,873,107 A | 2/1999 | Borovoy et al. | |
| 7,200,555 B1 * | 4/2007 | Ballard et al. | 704/235 |
| 7,669,138 B2 * | 2/2010 | Novy | 715/763 |
| 8,014,996 B1 * | 9/2011 | Kinder | 704/1 |
| 2002/0099775 A1 * | 7/2002 | Gupta et al. | 709/205 |
| 2002/0138582 A1 * | 9/2002 | Chandra et al. | 709/206 |
| 2006/0069728 A1 * | 3/2006 | McEvilly et al. | 709/206 |
| 2007/0016614 A1 * | 1/2007 | Novy | 707/104.1 |
| 2007/0016647 A1 * | 1/2007 | Gupta et al. | 709/206 |
| 2007/0112919 A1 | 5/2007 | Lyle et al. | |
| 2009/0106224 A1 | 4/2009 | Roulland et al. | |
| 2009/0112576 A1 * | 4/2009 | Jackson | 704/9 |
| 2009/0177750 A1 | 7/2009 | Lee et al. | |
| 2010/0036830 A1 | 2/2010 | Lee | |
| 2010/0070908 A1 * | 3/2010 | Mori et al. | 715/773 |
| 2010/0134413 A1 * | 6/2010 | Willey | 345/157 |
| 2010/0169441 A1 * | 7/2010 | Lafleur et al. | 709/206 |
| 2010/0169447 A1 * | 7/2010 | Mermod et al. | 709/206 |
| 2010/0293447 A1 * | 11/2010 | Kadowaki et al. | 715/201 |

FOREIGN PATENT DOCUMENTS

| | | |
|---|---|---|
| KR | 1020090019198 A | 2/2009 |
| KR | 1020100031595 A | 3/2010 |

OTHER PUBLICATIONS

Meredith, Leslie, "Bing Aims to Reinvent Search", Retrieved at << http://www.technewsdaily.com/bing-aims-to-reinvent-search-0263/ >>, Mar. 5, 2010, 3 pages.

(Continued)

*Primary Examiner* — Merilyn Nguyen

(57) ABSTRACT

An authoring system on a mobile device (or other type of device) may help a user to author a message based on context available on the device. Context data comes to exist on the device in some manner. For example, the context may contain the results of a search that a user has performed on the device. A message may be proposed based on the search query and/or the result—e.g., if a user searches for "Edinburgh," the authoring system may propose the message "Username likes Edinburgh" or "Username is learning about Edinburgh." The authoring system may allow the user to change the message and/or to add additional content and/or links to the message. The user may then to send the message over some channel such as e-mail, a social network, a microblogging site, etc.

8 Claims, 7 Drawing Sheets

OTHER PUBLICATIONS

Strohmaier, et al., "Intentional Query Suggestion: Making User Goals More Explicit During Search", Retrieved at << http://www.kmi.tugraz.at/staff/markus/documents/2009_WSCD09_Intentional-Query-Suggestion.pdf >>, Web Search and Web Data Mining, Proceedings of the 2009 workshop on Web Search Click Data, Feb. 9, 2009, 7 pages.

Ntoulas, et al., "The Infocious Web Search Engine: Improving Web Searching Through Linguistic Analysis", Retrieved at << http://oak.cs.ucla.edu/~cho/papers/ntoulas-infocious.pdf >>, in proceedings of the 14th International World Wide Web Conference (WWW2005), May 10-14, 2005, pp. 840-849.

Klyuev, Vitaly., "An approach to implementing an intelligent web search", Retrieved at << http://www.informatics.org.cn/doc/ucit200907/ucit20090710.pdf >>, FCST, Proceedings of the 2008 Japan-China Joint Workshop on Frontier of Computer Science and Technology, Dec. 27-28, 2008, pp. 52-57.

Zha, et al., "Visual Query Suggestion", Retrieved at << http://staff.science.uva.nl/~cgmsnoek/pub/readinggroup/ZhaVisualQuerySuggestion.pdf >>, International Multimedia Conference, Proceedings of the seventeen ACM international conference on Multimedia, Oct. 19 24, 2009, pp. 15-24.

"Ubiquity in Firefox: Focus on Japanese", Retrieved at << http://mitcho.com/blog/projects/ubiquity-in-firefox-japanese/ >>, Retrieved Date: Apr. 13, 2010, published date: Feb. 20, 2009, pp. 1-15.

"International Search Report and Written Opinion of the International Searching Authority", Mailed Date: Feb. 9, 2012, Application No. PCT/US2011/037817, Filed Date: May 24, 2011, 8 pages.

\* cited by examiner

ASSISTED CONTENT AUTHORING

BACKGROUND

Messages and other text content are normally composed on a computer using a keyboard. A traditional computer has a QWERTY keyboard with mechanically movable keys, which allows a user to enter text by typing. As it has become possible to put more computing power into a smaller device, many functions that were traditionally performed on desktop and laptop computers are now being performed on smaller devices such as handheld computers, phones, music players, and tablet devices.

While it is possible to miniaturize components such as a processor, memory, disk, and network interface, one component that cannot easily be miniaturized beyond a certain point is a physical keyboard that is large enough to be used comfortably by human hands. Small devices often have mechanisms for text input, such as an on-screen keyboard operated through a touch screen, a tiny keyboard designed to be operated by thumbs (as on some smart phones devices), double- or triple-duty keys that each represent two or three letters of the alphabet (as on basic wireless phones), or handwriting recognitions systems. However, these mechanisms normally do not provide the ease of a full-size keyboard when it comes to composing text content.

When a person uses a device (small or large), there various contextual clues that may be available and that might help the user compose the message without having to enter the message from scratch. However, existing systems generally are not designed to make use of these clues.

SUMMARY

A device may assist a user in authoring content by using context that is available on the device. The user may indicate, through some mechanism on the device, that the user wants to compose a message. In response to this indication, the device may propose a message to be sent. The device may also present the user with discrete options to modify the proposed message, or to add additional content to the message. The device may then offer the user the ability to send the message out over various channels, such as an e-mail message, a social network post, etc.

In order to propose a message, the device leverages the notion that many messages follow a common pattern, and often relate to what the user is currently doing with the device. For example, people post their "status" on social networks, where the status is a description of what a person is doing, thinking, or feeling at that moment. Thus, if a device belongs to a user named "Joe," a common message might be of the form "Joe is visiting Seattle," or "Joe likes the New York Philharmonic," or—in general—"Joe <verb> <object>". The verb and object can be inferred from context available on the device itself. If the device has recently done a search on the city of Edinburgh, Scotland, then an appropriate message to infer might be "Joe is learning about Edinburgh." Or, if a Global Positioning System (GPS) on the device indicates that Joe is in Seattle and is moving at walking speed, then it might be appropriate to say, "Joe is walking in Seattle." Thus, context available on a device can provide a reasonable guess about what the device user might have wanted to say if he or she had typed a message.

However, the proposed message may not be the final message that is sent from the device. The user may be given the opportunity to change the verb in the message, or to add additional information or links to the message. For example, if the user of a device is currently in Lincoln Center listening to a New York Philharmonic concert (a fact that might be determined through the device's location, the current time, and an Internet-available schedule of concerts), the device may propose the message "Joe likes the New York Philharmonic." However, while this message is a reasonable guess, it pre-supposes what Joe actually wants to say. Perhaps Joe does not like the concert, or is not sure what he thinks about the concert, or wants to reserve judgment. In that case, Joe might want to change the verb "likes" to "dislikes," "is not sure about," or "wants to learn more about." An interface, such as a menu, could be provided to allow Joe to make this verb change. In this way, the device may help the user to compose a message that accurately reflects what the user wants to say, without the user's having to type the entire message.

In addition to allowing verb changes, the user can also be provided the opportunity to add additional information to the message. For example, suppose the user does a search on the term "Edinburgh," and one of the items in the search results is a travel review of that city. A message authoring system might propose the message "Joe is learning about Edinburgh" (a fact that can be inferred from the search query itself). However, the user might have read the review of Edinburgh, and might want to add information about that review. Thus, the message authoring system might give the user the option to add the phrase, "and agrees with the review on the travel. example.com web site." The message authoring system does not know whether the user wants to make this statement, but the possibility that he does can reasonably be inferred from the fact that the travel web site appeared in the search results. Thus, the message authoring system can help the user by offering this option. The system can also allow the user to change the verb (e.g., changing "agrees" to "disagrees"). Similarly, the system may allow the user to attach a link to that travel web site (possibly through a Uniform Resource Locator (URL) shortening service).

The techniques described herein may be used on a mobile device, or other small device, where a full-size keyboard is unavailable. However, the same techniques could be used on any computing device. For example, a message authoring system that proposes message may be used to help a user to compose messages even on a desktop or laptop computer, even when a full keyboard is available.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
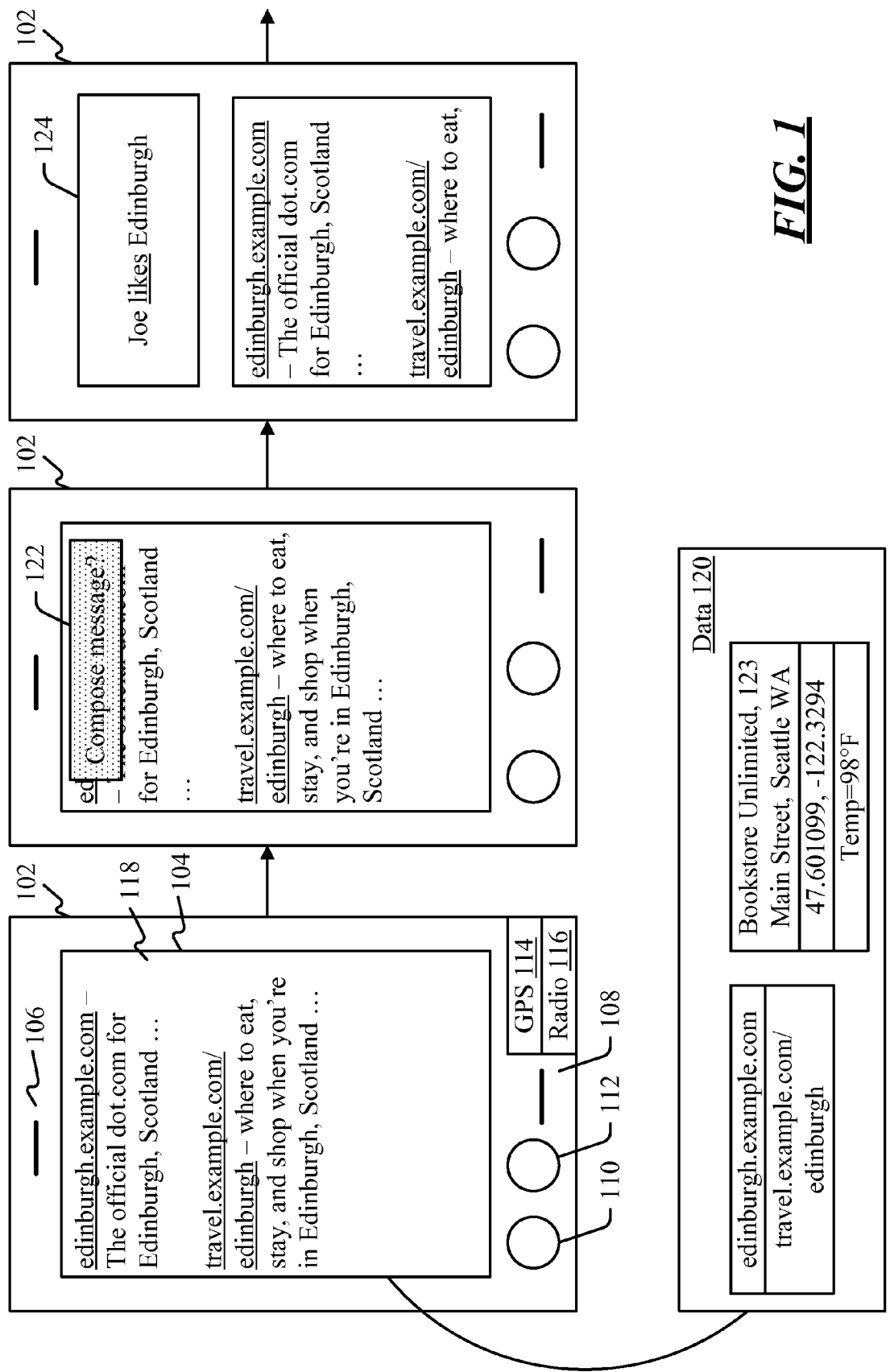
FIGS. 1-3 are diagrams of an example workflow in which a device may help a user to compose a message.

Users often use their computers or other devices to compose and send messages. Traditionally, messages are composed on a computer using a full-size keyboard. However, as it has become possible to put more computing capability into a smaller space, many functions that were traditionally performed on a desktop or laptop computer are now performed on smaller devices such as handheld computers, phones, music players, tablet devices, etc. These devices generally have some sort of text-input mechanism such as a thumb-size keyboard, an on-screen keyboard or handwriting recognizer operated through a touch screen, or double- or triple-duty keys that each represent two or three letters. But these devices generally do not provide the ease of a full-size keyboard for entering content.

However, when it comes to creating content, smaller devices often have something that larger devices lack: very detailed context. Since computers (even laptop computers) normally stay in one place and are used for many tasks at the same time, it may be hard to get a sense of what the user is actually doing or interested in. Not so with smaller devices. Small devices are often carried with the user, and their location can be determined through GPS or triangulation. Moreover, the way in which these devices are used often has an immediacy that is not present in the way that larger computers are used. If a person searches for a restaurant on a desktop computer, he or she may be thinking of going to that restaurant in the next day, week, or month. If a person searches for a restaurant on a handheld device, it is likely that he or she is looking for a place to eat right now. If a person uploads a photo to a social network, he may be simply clearing the memory card of his camera, and the photos might be taken during last year's vacation. If that person uploads a photo from his or her mobile device, it is likely that the photo was taken within the last few minutes. Context does exist on a desktop or laptop computer. The fact that a user has entered a search query does suggest something about what the user is looking for. However, the fact that small devices can reveal their location and their use is likely to reflect the user's immediate interests makes the inference of context on a small device particularly compelling.

The subject matter described herein may be used to help the user author a message. A message-authoring system may attempt to infer what a user would want to say if he or she were able to type a message, and may make use of context information to do so. For example, if the user has done a search on the term "Edinburgh," then it is reasonably inferable that the user interested in the city of Edinburgh, Scotland. This inference is reasonable regardless of what type of device the search is done on (e.g., desktop computer, smart phone, etc.). However, as noted above, if the user has done the search on a smart phone, then given the relative difficulty of entering a text query on a smart phone, the fact that the user has made the effort to enter the query may reflect that the user has a particular interest, at this moment, in learning about Edinburgh.

A message may be created based on the inferred context. A device might have message authoring software that allows a user to request to create a message based on his or her current context. For example, there might be a drop down menu, on-screen button, etc., that allows the user to request to create a message. If the user associated with a device is named Joe, then it is possible to compose the message "Joe likes Edinburgh" based on the fact that Joe has just done a search for Edinburgh. Of course, this message might not be the thought that Joe wants to express, but if Joe asks to create a message right after doing a search on the term "Edinburgh," then this is a reasonable message to propose. The message authoring software might allow Joe to change the message in some way.

For example, the proposed message in this example contains the verb phrase "likes" and the object noun "Edinburgh." The message authoring system might allow Joe to change the verb to "is learning about," "dislikes," "isn't sure about," "wants to visit," etc. In this way, the message authoring system allows Joe to express a variety of different thoughts about what he is doing or thinking, without having to enter those thoughts from scratch. These changes to the verb might be available through a drop down menu that provides various verb choices. Depending on the circumstances, the message authoring system might provide a similar menu to allow the user to change the noun(s) in the proposed message. (In the discussion here, the term "verb" may be used to describe any verb phrase (which may include verbs, participles, prepositions, etc.), and the term "noun" may be used to describe any object of a verb phrase (which may include nouns, pronouns, articles, adjectives, etc.) Thus, a phrase such as "is learning about" is understood herein as a type of "verb", even though it contains the present participle "learning" and the preposition "about".)

The message authoring system may also allow a user to add information to a message. For example, Joe might want to add some more information to the message such as "and wants to visit soon." This type of text could also be proposed to Joe through an appropriate mechanism (e.g., a menu of candidate choices). The particular choices that are offered might be inferred from context. For example, if one of the search results from Joe's search is a travel review of Edinburgh from the web site travel.example.com, then some choices that the message authoring system might offer are "and agrees with the review on travel.example.com," or "and disagrees with the review on travel.example.com." Moreover, the message authoring system could attach a link to the review in question, where the link might be in its original form or in a shortened form using a URL-shortening service such as tinyurl or bit.ly.

The message authoring system could also suggest phrases based on things other than search results, such as sensor information available at the device. For example, A GPS system on the device might be able to determine Joe's current location at the time of the query (e.g., Seattle). On this basis, the message authoring system could propose the phrase "and wishes it were less than 4485 miles away." (4485 miles is the actual distance between the Seattle and Edinburg airports.) Or, a temperature sensor at the device might indicate that the current temperature in Seattle is 98 degrees Fahrenheit, and on this basis the message authoring system might propose the phrase "and wants to get out of this heat." Any variation on this theme may be used.

Figure 2:
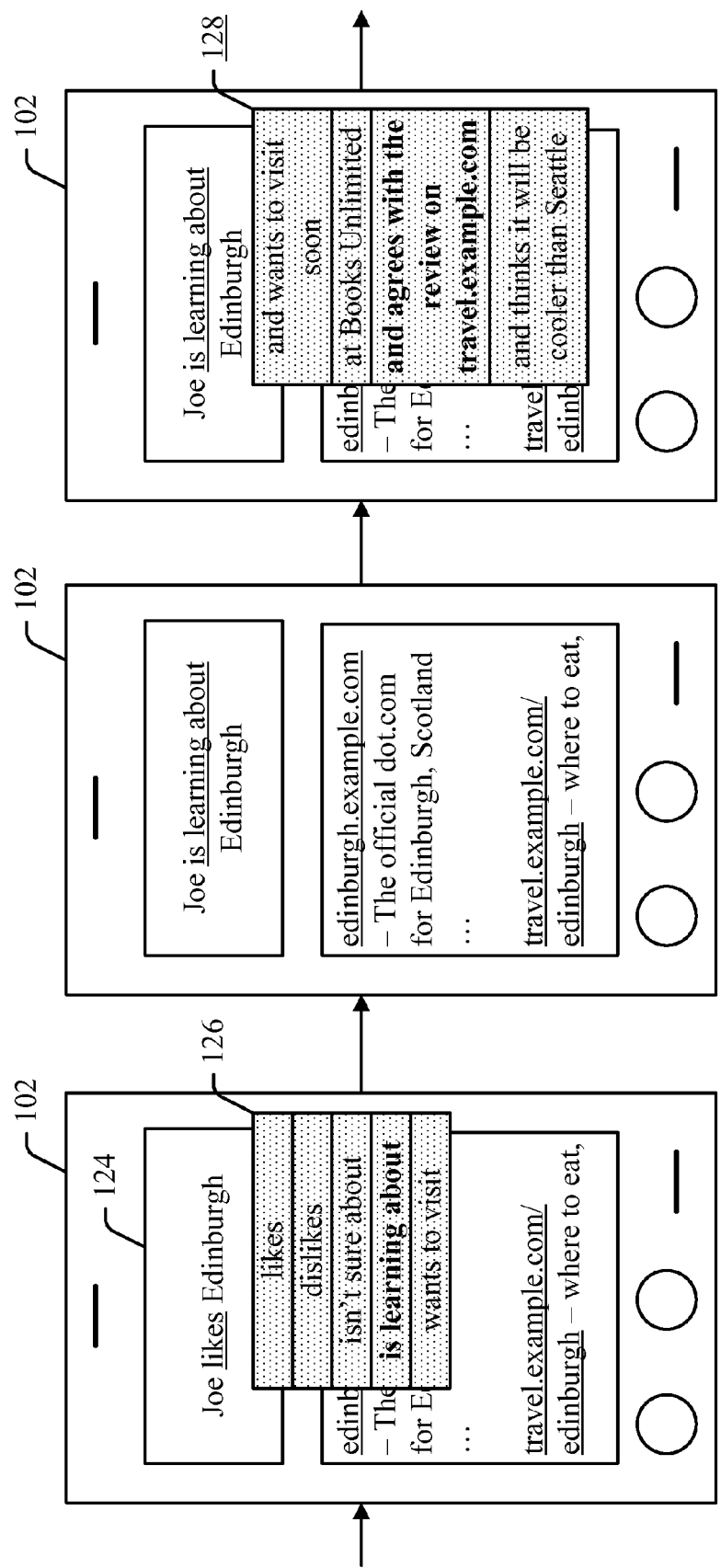
Figure 3:
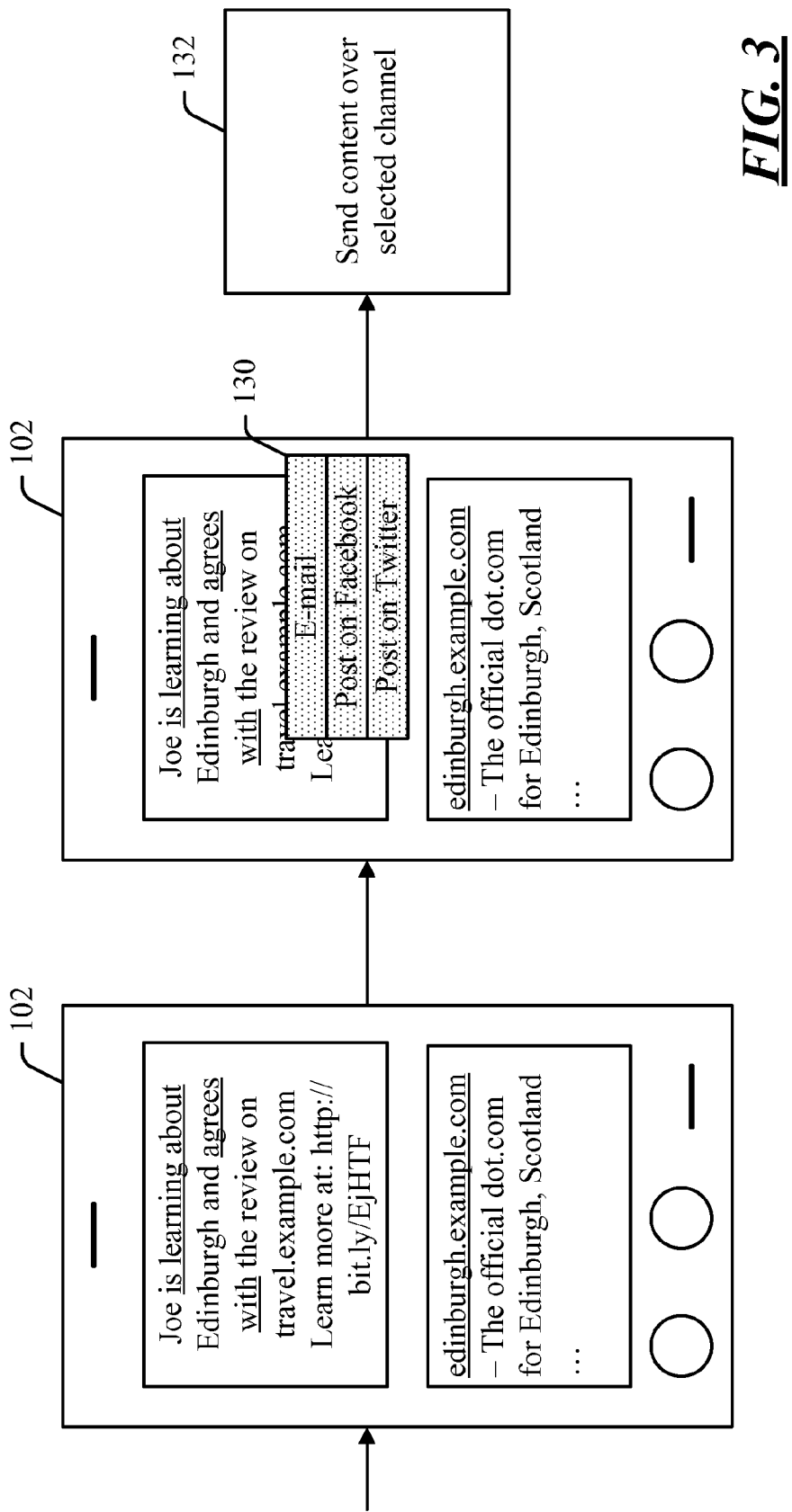

Turning now to the drawings, FIGS. 1, 2, and 3 show an example workflow in which a device may help a user to compose a message. Device 102 is a device that may be associated with a user. In one example, device 102 is a user's wireless phone and, as depicted in FIGS. 1-3, device 102 is drawn (solely for example purposes) as if it were a smart phone with a touch screen 104. However, device 102 could also be a handheld computer, handheld music player, tablet device, full-size laptop or desktop computer, etc. Device 102 may have various components, such as speaker 106, microphone 108, camera 110, button 112, GPS receiver 114, and radio 116. Speaker 106 and microphone 108 may provide audio output and input, respectively, for device 102. Camera 110 may provide visual input for device 102. Button 112 may provide a mode of allowing a user to interact with software on device 102—e.g., device 102 may be configured to provide a menu of software or other options when a user presses button 112. GPS receiver 114 may receive signals from satellites, and may contain logic to determine the location of device 102 based on those signals. Radio 116 may allow device 102 to engage in two-way communication through electro-magnetic waves (e.g., by allowing device 102 to communicate with cellular communication towers). Touch screen 104 may act as both a visual output device and a tactile input device.

In the example of FIGS. 1-3, at some point in time a user of device 102 has performed a search on Edinburgh, Scotland (perhaps by entering the query "Edinburgh" into device 102 through an on-screen keyboard or some other mechanism). As a result of requesting the search, device 102 has contacted a remote search engine or other service and has obtained search results. Those search results 118 are shown on touch screen 104 in the first view of device 102 that appears in FIG. 1.

What is not shown on touch screen 104 is that various types of data 120 may accompany the search results, or may otherwise be part of the search results, or may otherwise be available on device 102. In the example shown, these data 120 may include the URLs of web sites that appear in the search results (e.g., edinburgh.example.com and travel.example.com/edinburgh), the user's current location at 47.601099 degrees north latitude and 122.3294 degrees west longitude (which might be determined through GPS receiver 114), the name and street address of the user's current location (e.g., the Books Unlimited store, which might have been inferred by the search service from the device's latitude/longitude), and the current temperature (which might be determined by a thermometer on device 102). Data 120 provides context that may be used by a message authoring service to compose a message. This context is available through the user's recent activity (e.g., search results) and from sensors available on the device (e.g., GPS receiver 114, a thermometer, etc.).

At some point after the search is done, the user may opt to compose a message. For example, an application could be installed on device 102 that allows the user to request to compose a message, where such an application would be an example of a message authoring system. This application could be activated in various ways. In one example, tapping on the screen in some manner might be used to activate the application (e.g., tapping near on-screen content about which one wants to create a message), although the application could be activated in any manner. In the example of FIGS. 1-3, the user has tapped touch screen 104, thereby causing pop-up menu 122 to appear in the second view of device 102 in FIG. 1. The pop-up menu asks the user if he or she would like to compose a message. If the user gives a yes indication (e.g., by tapping on the "compose message?" words in menu 122), then the message authoring system may compose a message 124 as shown in the third view of device 102 in FIG. 1. (In the example of FIG. 1, pop-up menu 122 allows a user to select only a single option, i.e., the "compose message" action, although pop-up menu could offer several actions from which a user could select.)

Message 124 is a form of proposed message. If the user of the device is named Joe (a fact that may be known to the device through prior input), then the fact that the user has done a search on the term "Edinburgh" has caused the message authoring system to propose the message "Joe likes Edinburgh." Joe may or may not agree with this message. He could decide to discard the message altogether at this point. However, it will be observed that a visual emphasis is put on the verb "likes" in the message (where the underlining shown in FIG. 1 is an example form of visual emphasis). In the example message authoring system shown in FIGS. 1-3, underlining may indicate that a word can be replaced with other options. The message authoring system may propose these options.

For example, the first view of device 102 in FIG. 2 shows a menu 126. A message authoring system may present this menu to a user of device 102 in order to allow that user to change the verb in proposed message 124. For example, a user might access menu 126 by using touch screen 104 to tap on the word that the user wants to change. (Menu 126 is an example of a user interface that could be presented to a user to allow the user to change text.) Having activated menu 126 in some manner, the user is given a choice of verbs with which the user can replace "likes" in the proposed message. The replacement verbs are distinct from the original verb "likes" in the sense that the replacement verbs in menu 126 are not the same as the original verb "likes." For example, as shown, the user might change "likes" to "dislikes," "isn't sure about," "is learning about," "wants to visit," etc. The replacement verbs, as well as the original verb, may be chosen based on the object. That is, a verb such as "wants to visit" may be considered appropriate due to the fact that the object/noun in the proposed message is the name of a place. Thus, an object that is the name of a movie might generate a different choice of verbs than an object that is the name of a restaurant. E.g., the verb "is eating at" might be appropriate for a restaurant, while "is watching" might be appropriate for a movie.)

Suppose, at that point, Joe changes the verb from "likes" to "is learning about" (as indicated by the bold selection in the first view of device 102 in FIG. 2). Then, as indicated in the second view of device 102 in FIG. 2, the message authoring system may change the message 124 from "Joe likes Edinburgh" to "Joe is learning about Edinburgh," thereby creating a modified message. In this way, the message authoring system has helped Joe to express the thought he wants to communicate without Joe having to type, compose, or otherwise enter the message. As described above, the message authoring system has assisted Joe by using context information to infer what kind of message Joe would want to write, and then allowing him to select modifications to that message from a list of plausible alternatives. (Examples of entering and/or composing a message include typing text with a mechanical or on-screen keyboard, speaking into a speech-to-text system, or writing text into a handwriting recognition system. Thus, these types of text entry are examples of what a user may be able to avoid doing if the system is able to propose text that the user accepts.)

It is noted that, in the above example, Joe is given a drop-down menu to replace verbs in the proposed text. However, the verb in the proposed text is merely an example of a segment of text. In general, there may be some segment of proposed text, and that segment may contain some specific content in the form of a specific sequence of words. The message authoring system may give the user a way to replace one instance of content in that segment with another instance of content (e.g., replacing one sequence of one or more words with another sequence of zero or more words).

The message authoring system may also help Joe to enrich the content in other ways. For example, as shown in the third view of device 102 in FIG. 2, the message authoring system may also Joe to add additional information to the message. For example, at the time that Joe performed the search, Joe may have been at the bookstore named Books Unlimited. This fact may have been inferred from the location of Joe's device, and possibly some information received from a search engine (or other service). (E.g., when Joe performed the search, his latitude and longitude may have been transmitted to the service, which may have looked up the business that is nearest to Joe's location, and thus may have inferred that Joe was in the Books Unlimited store at the time that he performed the search.) Thus, based on this information, the message authoring system may offer Joe the opportunity to add the phrase "at Books Unlimited" to the message (as indicated in menu 128), which would make the aggregate message say, "Joe is learning about Edinburgh at Books Unlimited." (In the example of FIGS. 1-3, Joe has already modified the message by changing the verb in the original proposed message. Thus, if Joe adds a phrase to the message, he is including the phrase in the modified message.)

As another example, as described above the search results that provided the context information included a travel review of Edinburgh from the web site travel.example.com. Thus, the message authoring system may give Joe the option of adding the phrase "and agrees with the review on travel.example.com" to the message. Or, as another example, as shown in FIG. 1, the context data 120 may include the current temperature at device 102 (which may have been determined from a thermometer on device 102). Based on how hot it is at Joe's location on this day, the message authoring system might offer a phrase such as "and thinks it will be cooler than Seattle," so that the aggregate message would say, "Joe is learning about Edinburgh and thinks it will be cooler than Seattle. (The message authoring system may choose to make Seattle the target of the comparison based on having learned, from the latitude and longitude of the device, that Joe is currently in Seattle while performing the research about Edinburgh.) The foregoing are merely some examples of content that could be suggested by a message authoring system. These examples are not limiting of the subject matter herein, but merely are intended to demonstrate the scope and flexibility of the process of helping a user to compose a message. It is noted that Joe might not choose to add any of the text offered in menu 128. For example, he might not agree with the review on travel.example.com, or might not agree with the proposed statement about the temperature. However, given the available context data 120, the proposed content contains plausible statements that message authoring system may propose to Joe in the interest of helping him to compose a relevant message.

In addition to adding a message from menu 128, a message authoring system may also allow a user to add a link. As noted above, one piece of information that is part of context data 120 is the fact that the travel.example.com/edinburgh web page appeared in Joe's search results. Thus, in addition to offering Joe the option to add text about that review, a message authoring system may also offer Joe the opportunity to include a link to that review, as shown in the first view of device 102 in FIG. 3. In this example, the user has added text about the travel.example.com review of Edinburgh, and the link that is proposed for inclusion in the message is that particular link. Thus, in this example, the message authoring system is choosing a particular link based on the fact that the link relates to text that the user has decided to include in the message. However, a link could be chosen in any manner and for any reason. It is noted that the link could be the original URL (travel.example.com/edinburgh). Or, the link could be a short URL provided by a URL-shortening service such as TinyURL or bit.ly, as shown in FIG. 3. In FIG. 3, such a link appears in the message. Also, it is noted that the link may be included in the message automatically and/or by default. However, the user could have the option to interact with the message service in some way in order to choose whether to include the link—e.g., the user might tap the link, which might bring up a menu asking the user whether he or she wants to include the link, or offering the user several links that could be included. It is noted that any amount or type of content could be added to the proposed message. For example, while FIGS. 1-3 show a single phrase and a single URL being added to a proposed message, in general any number of phrases, any number of URLs, and any type or amount of content could be added to the message.

Once the message has been created, the device may allow the user to propagate the message through various channels. For example, as shown in menu 130, the user may be offered the opportunity to propagate the message over a channel such as e-mail, Facebook, Twitter, etc. The device and/or the message authoring system may have a copy of the user's credentials on e-mail and/or social networking systems, thereby allowing the device or message authoring system to propagate the message to these systems on the user's behalf. Once the user has chosen a channel through which to propagate the message, the message is propagated through the selected channel (block 132).

Figure 4:
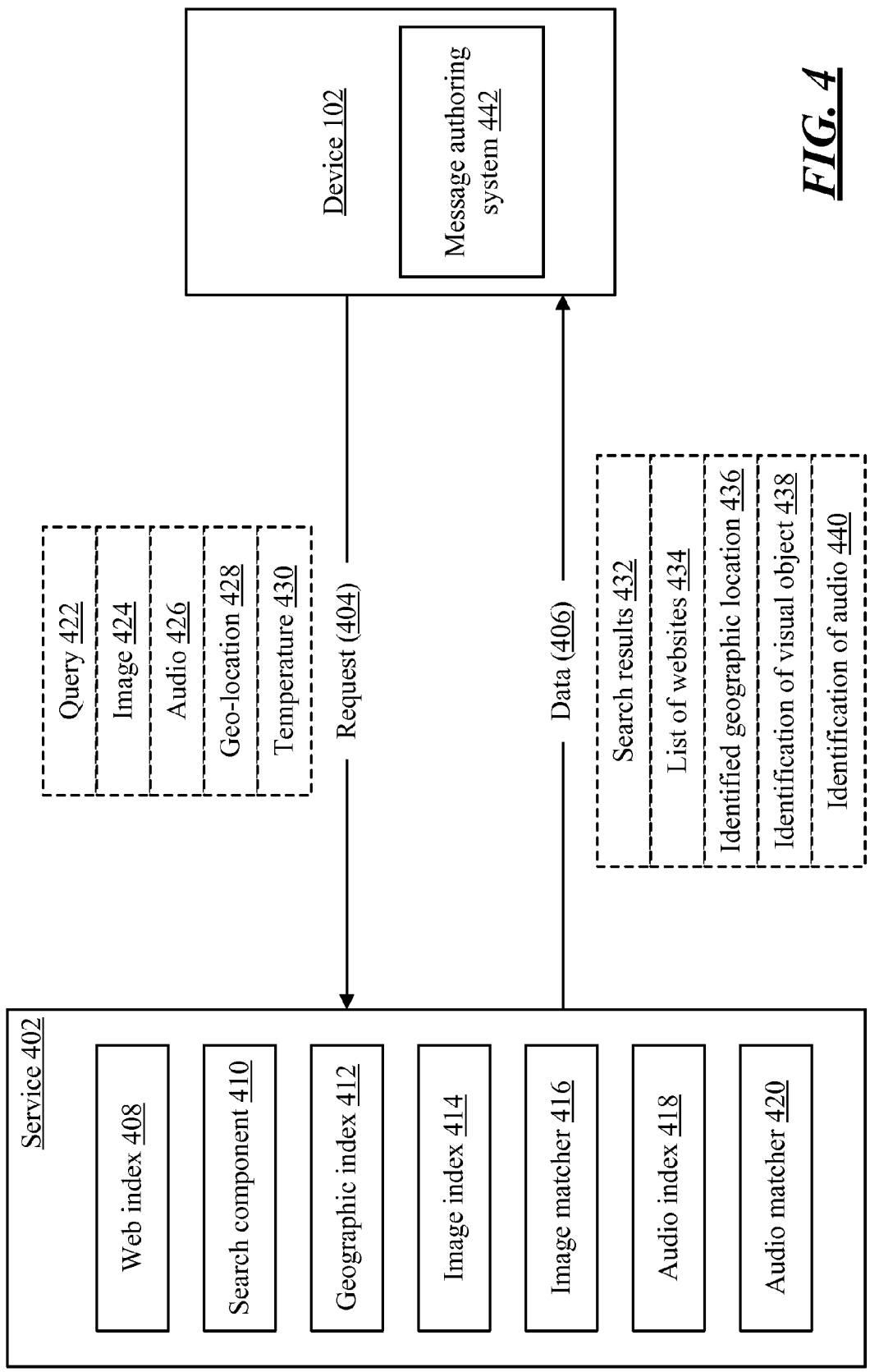
FIG. 4 is a block diagram of an example environment in which a device may obtain context information that may be used to author a message.

FIG. 4 shows an example environment in which a device may obtain context information that may be used to author a message. Device 102 is the device shown in FIGS. 1-3. As noted above, device 102 may be, for example, a wireless telephone, a handheld computer, a music player, a laptop or desktop computer, etc. Device 102 may contain a message authoring system 442, which may be software and/or hardware on device 102 that implements some or all of the message authoring functionality described above in connection with FIGS. 1-3. Service 402 is a service that device 102 may access through a network. For example, device 102 may communicate with service 402 through a wired network such as an Ethernet, a wireless network such as WiFi or Bluetooth, or some combination of wired and wireless networks. In one example, device 102 is a wireless telephone that communicates with service 402 through a cellular network (e.g., by using a radio to communicate with a cellular tower, which relays information between device 102 and networks such as the telephone system and/or the Internet). Service 402 may be implemented, for example, by a server machine or by a cluster of server machines.

Regardless of the mechanism by which device 102 communicates with service 402, in one example mode of operation device 102 may submit some type of request 404 to service 402, and may receive some type of data 406 from service 402 in response. The nature of request 404 and data 406 may depend on the particular type of functionality that service 402 provides. FIG. 4 shows some example types of components and functionality that may be provided by service 402.

In one example, service 402 functions as a search engine, in which case service 402 may have a web index 408 and a search component 410 that uses web index 408 to provide search results based on a query. Service 402 may also comprise a geographic index 412 that maps particular locations into particular items (e.g., objects, businesses, residences, etc.) that are located at those locations. Search component 410 (or some other component) may use geographic index to identify objects, businesses, residences, that are located at a given location. Service 402 may comprise image index 414, which contains metadata that describe images. Image matcher 416 may be a component that compares an input image with image index 414 in order to determine what image in an index corresponds to the input image. Similarly, service 402 may comprise audio index 418 and audio matcher 420, where audio matcher 420 receives audio as input and determines what (if any) audio in audio index 418 matches the input audio. Thus, service 402 may have the ability to generate search results based on a text query, or to identify an object (or residence, or business, etc.) at a particular geographic location, or to match an image or an audio clip with a set of known images and/or audio clips, or may contain some other functionality. In one example, service 402 provides a combination of one or more such functionalities.

Thus, based on the type of functionality that service 402 provides, request 404 may provide various types of information to service 402. For example, request 404 may comprise a text query 422 entered on device 102, an image 424 captured by a camera on device 102, an audio clip 426 captured by a microphone on device 102, a geographic location 428 identified by a GPS or triangulation component on device 102, a temperature 430 measured by a thermometer on device 102, or any other type of information. This information may be processed by the appropriate component(s) of service 402.

When service 402 has processed the information contained in request 404, it may return data 406, which are responsive to request 404. For example, data 406 may contain search results 432 (including, for example, a list of web sites 434), an identification 436 of a business (or residence, or object, etc.) at a particular geographic location, an identification 438 of visual object in response to an image search, an identification 440 of audio in response to an audio search, or any other appropriate type of information. The data 406 that is returned from service 402 to device 102 may form all or part of the context data 120 (shown in FIG. 1), which may be used by a message authoring system as the basis to suggest content for a message.

Figure 5:
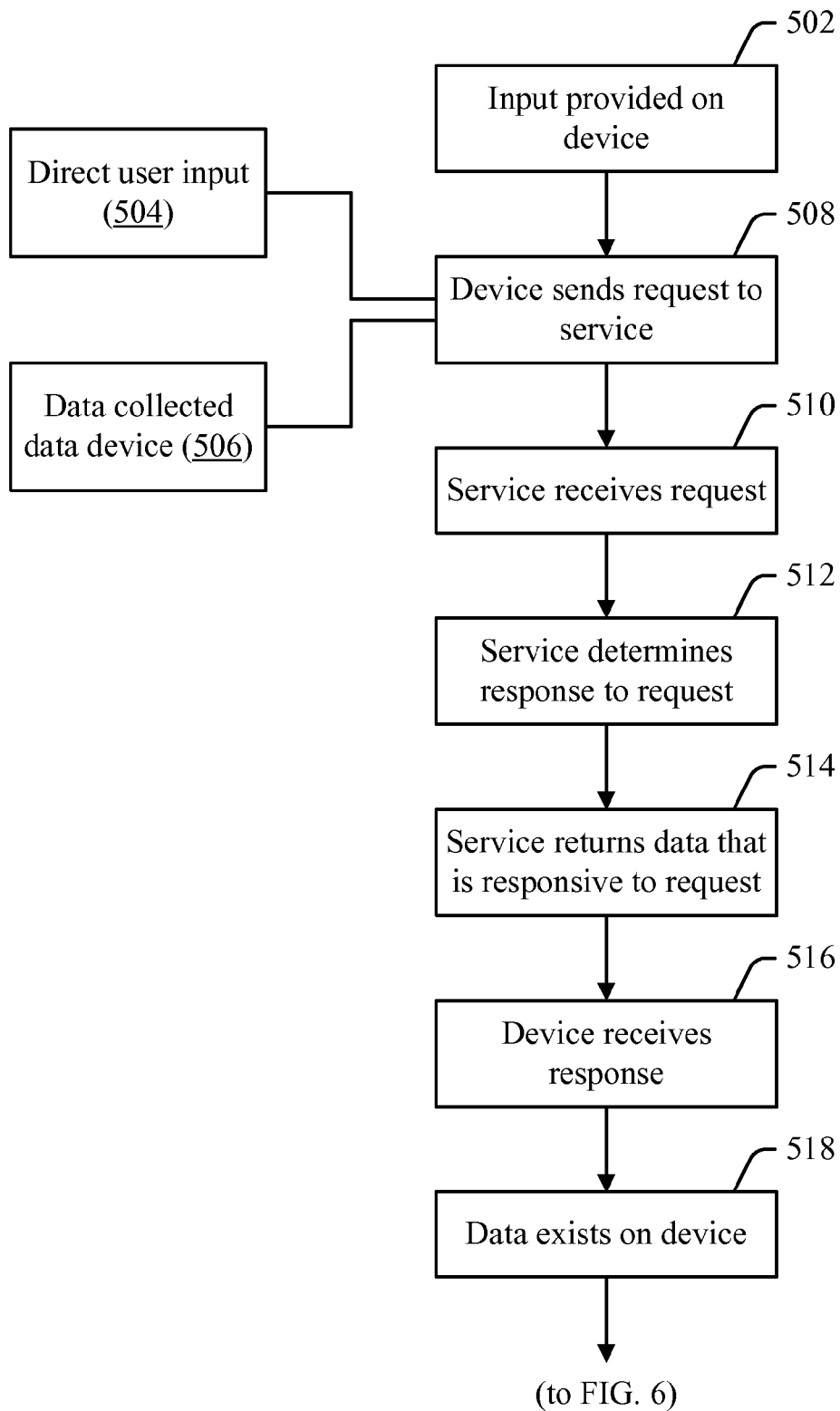
FIGS. 5-6 are a flow diagram of an example process in which a message may be authored and communicated.
Figure 6:
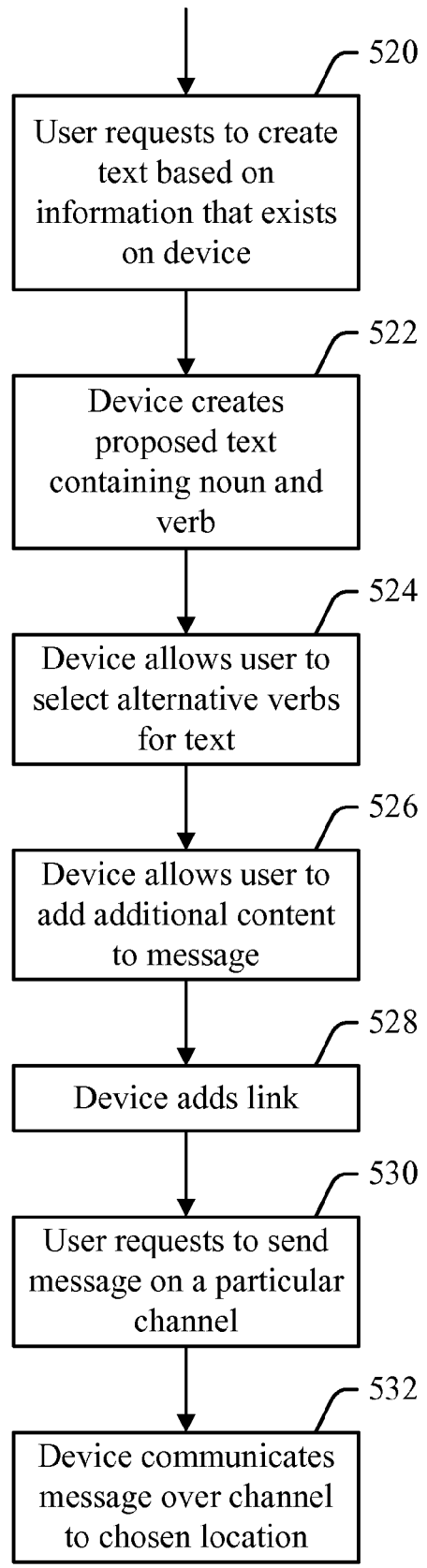

FIGS. 5 and 6 show an example process in which a message may be authored and communicated. Before turning to a description of FIGS. 5-6, it is noted that the flow diagram contained in those figures is described, by way of example, with reference to components shown in FIGS. 1-4, although this process may be carried out in any system and is not limited to the scenarios shown in FIGS. 1-4. Additionally, the flow diagram in FIGS. 5-6 shows an example in which stages of a process are carried out in a particular order, as indicated by the lines connecting the blocks, but the various stages shown in these diagrams can be performed in any order, or in any combination or sub-combination.

At 502, input may be provided on a device. The device may be, for example, device 102 shown in FIGS. 1-4. The input may take various forms. In one example, the input may be direct user input 504, such as text entered through a keypad, touch screen, etc. An example of such text data is a search query, although any type of data could be provided. Additionally, direct input provided by a user could be some form of non-text data, such as an arbitrary drawing entered on a touch screen with a stylus or finger. In another example, the input may be some input that was collected at the device (block 506), such as visual or audio input captured with the device's camera or microphone, GPS data collected with a GPS receiver, temperature data collected with a thermometer, etc.

At 508, a request may be sent to a service. The service may be, for example, service 402 shown in FIG. 4, and may provide the various functionalities that are mentioned above in connection with the description of service 402. The request may contain data that comprises, or is derived from, the input that was obtained at 502. This request is received by the service at 510.

At 512, the service determines the response to the request. For example, if the request comprises a search query, the service may identify web sites, images, or other types of context that are responsive to the query. If the request comprises a geographic location (e.g., in the form of latitude and longitude), the service may identify businesses, residences, objects, etc., that are known to exist at the specified location. Once the appropriate response has been determined, the service returns data that is responsive to the request at 514. The response is received by the device at 516. At that point, some type of data exists on the device (at 518), and this data may provide context from which a message may be created. It is noted that what is described at 502-516 is merely an example way of creating this data. Any type of data that exists on a device could be used as context data from which to construct a message. The notion of obtaining input on the device, sending it to a service, and receiving responsive data from the service is merely one example way in which context data could be created.

Regardless of the manner in which the data comes to exist on the device, this data may be used as context to create a message. At 520, the user requests to create some text based on information that exists on the device. (The "information that exists" on the device may be the data obtained from a service, or may be some other data on the device.) Based on this information, the device, at 522, creates proposed text that contains a noun and a verb. At 524, the device then allows the user to select alternative verbs for the text, in place of the verb initially proposed. (E.g., with reference to the example of FIGS. 1-3, the device might propose the verb "likes", and might allow the user to select the verb "dislikes" in its place.) At 526, the device may allow the user to add additional content to the message. (E.g., the phrase "and agrees with the review on travel.example.com," in the example discussed above, is an example of additional content that could be added to a message.) At 528, a link may be added to the message. The device may add the link automatically by default, or may request explicit user approval to add the link. At 530, the user may request to send the composed message over a particular channel—e.g., e-mail, a post on a social network or microblog, a Short Message Service (SMS) message, etc. At 532, the device communicates the message over the requested channel. Inasmuch as the message may originate on one machine and may be sent to a server that implements an e-mail service, social network service, etc., the act of communicating the message may involve transmitting data over a physical distance to a location that is remote from the device on which the message originates, and communication of the message may use tangible communication media.

Figure 7:
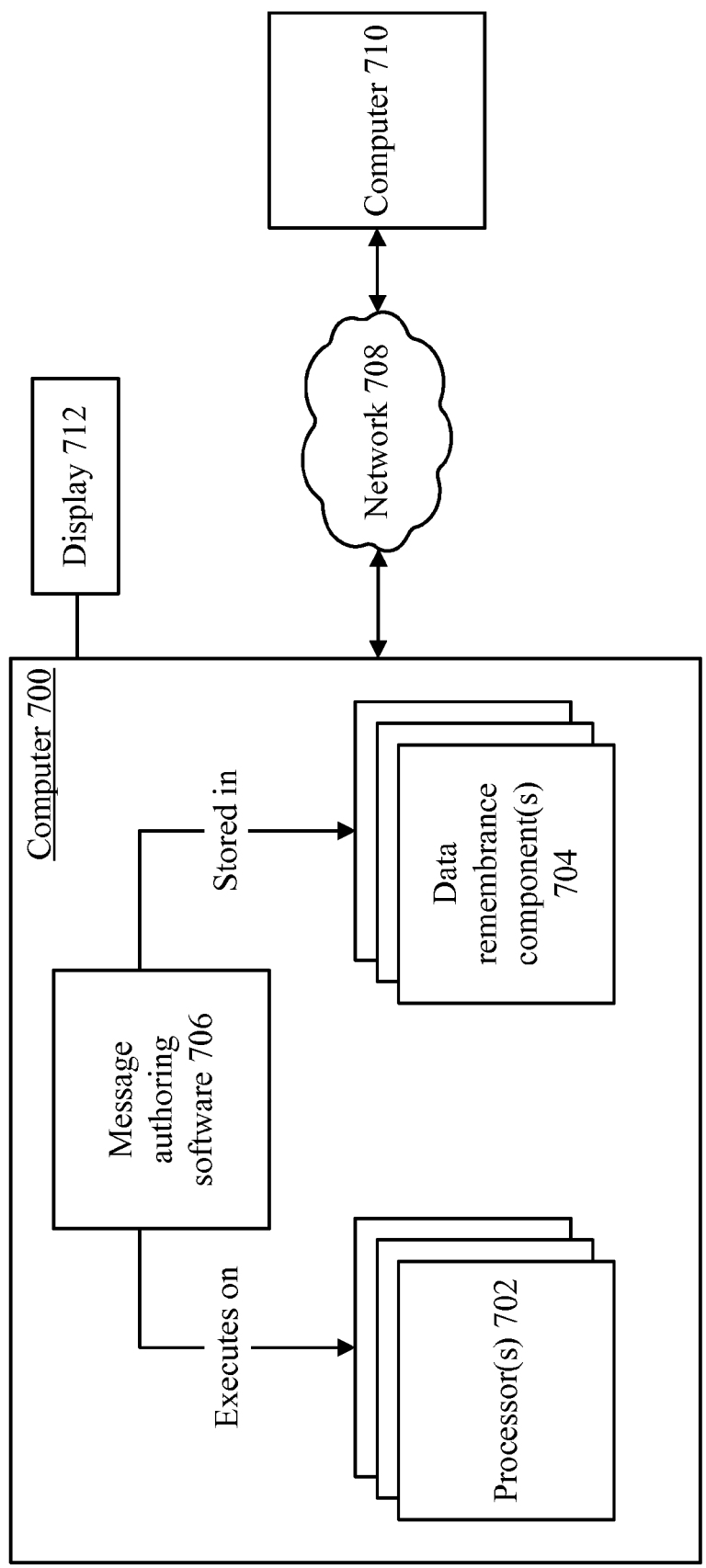
FIG. 7 is a block diagram of example components that may be used in connection with implementations of the subject matter described herein.

FIG. 7 shows an example environment in which aspects of the subject matter described herein may be deployed.

Computer 700 includes one or more processors 702 and one or more data remembrance components 704. Processor(s) 702 are typically microprocessors, such as those found in a personal desktop or laptop computer, a server, a handheld computer, or another kind of computing device. Data remembrance component(s) 704 are components that are capable of storing data for either the short or long term. Examples of data remembrance component(s) 704 include hard disks, removable disks (including optical and magnetic disks), volatile and non-volatile random-access memory (RAM), read-only memory (ROM), flash memory, magnetic tape, etc. Data remembrance component(s) are examples of computer-readable and/or device-readable storage media. Computer 700 may comprise, or be associated with, display 712, which may be a cathode ray tube (CRT) monitor, a liquid crystal display (LCD) monitor, or any other type of monitor. Computer 700 may be understood in a broad sense, as including any device that has some computing capability. For example, computer 700 may be a traditional desktop or laptop computer, or server computer, other types of devices that traditionally have the word "computer" in their names. However, computer 700 may also be a small computer, such as a handheld computer, a handheld music player, a smart phone or other type of telephone with some type of processing capability. In general, computer 700 may be any type of device that has the ability (or that contains a component that has the ability) to execute some kind of instructions. In one specific example, device 102 described above in connection with FIGS. 1-4 is an example of computer 700. Likewise, computer 710 (which is described below) may be any of the types of devices that computer 700 may be.

Software may be stored in the data remembrance component(s) 704, and may execute on the one or more processor(s) 702. An example of such software is message authoring software 706, which may implement some or all of the functionality described above in connection with FIGS. 1-6, although any type of software could be used. Software 706 may be implemented, for example, through one or more components, which may be components in a distributed system, separate files, separate functions, separate objects, separate lines of code, etc. A computer (e.g., personal computer, server computer, handheld computer, etc.) in which a program is stored on hard disk, loaded into RAM, and executed on the computer's processor(s) typifies the scenario depicted in FIG. 7, although the subject matter described herein is not limited to this example.

The subject matter described herein can be implemented as software that is stored in one or more of the data remembrance component(s) 704 and that executes on one or more of the processor(s) 702. As another example, the subject matter can be implemented as instructions that are stored on one or more computer-readable storage media. Tangible media, such as an optical disks or magnetic disks, are examples of storage media. The instructions may exist on non-transitory media. Such instructions, when executed by a computer or other machine, may cause the computer or other machine to perform one or more acts of a method. The instructions to perform the acts could be stored on one medium, or could be spread out across plural media, so that the instructions might appear collectively on the one or more computer-readable storage media, regardless of whether all of the instructions happen to be on the same medium.

Additionally, any acts described herein (whether or not shown in a diagram) may be performed by a processor (e.g., one or more of processors 702) as part of a method. Thus, if the acts A, B, and C are described herein, then a method may be performed that comprises the acts of A, B, and C. Moreover, if the acts of A, B, and C are described herein, then a method may be performed that comprises using a processor to perform the acts of A, B, and C.

In one example environment, computer 700 may be communicatively connected to one or more other devices through network 708. Computer 710, which may be similar in structure to computer 700, is an example of a device that can be connected to computer 700, although other types of devices may also be so connected.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. One or more device-readable storage memories or disks that store executable instructions to assist a user in authoring a message, wherein the instructions, when executed by a device, cause the device to perform acts comprising:
   receiving, at said device from said user, a search query;
   obtaining, from a service remote to said device, results in response to said search query;
   receiving, from said user, a request to create text based on information that exists on said device;
   in response to said request, creating, based on said information, proposed text that comprises a noun and a first verb, said information that exists on said device and on which said proposed text is based comprising said results;
   providing, to said user, a first interface that allows said user to replace said first verb with a second verb that is distinct from said first verb;
   receiving, from said user, a selection of said second verb to replace said first verb, thereby creating modified text that comprises said proposed text with said second verb in place of said first verb;
   deriving, from said results, a plurality of phrases;
   providing, to said user, a second interface that allows said user to select one of said plurality of phrases to be added to said modified text;
   including, in said modified text, said one of said plurality of phrases and a link to one of said results; and
   communicating said modified text from said device to a location remote from said device.

2. The one or more device-readable storage memories or disks of claim 1, wherein said acts further comprise:
   including, in said modified text, a link to a content item.

3. The one or more device-readable storage memories or disks of claim 2, wherein said information that exists on said device, based on which said proposed text is created, comprises said link to the content item, wherein said link to the content item is included in said modified text based on said user's having selected, for inclusion in said modified text, text to which said link to the content item relates.

4. A method helping a user to author a message, the method comprising:
   using a processor to perform acts comprising:
   receiving, at a device from said user, a search query;
   obtaining, from a service remote to said device, results in response to said search query;
   presenting data to said user on said device, said data comprising said results;
   receiving, from said user, an indication that said user wants to create a message based on said data;
   creating proposed text based on said data;
   presenting, to said user, a first interface that allows said user to modify said proposed text by replacing first content in a segment of said proposed text with second content that is distinct from said first content, wherein said first interface allows said user to modify said proposed text without said user's composing or entering said second content, wherein said first content in said segment comprises a verb in said proposed text;
   receiving, from said user, a selection of said second content;
   in said proposed text, replacing said first content with said second content, thereby creating modified text;
   deriving, from said data comprising said results, one or more phrases to present to said user;
   providing, to said user, a second interface that allows said user to select a phrase from said one or more phrases, wherein a phrase that said user selects is a selected phrase;
   including, in said modified text, said selected phrase and a link to one of said results; and
   transmitting said modified text over a channel.

5. The method of claim 4, wherein said acts further comprise:
   asking said user to select a first channel over which to send said modified text, wherein said transmitting transmits said modified text over said first channel.

6. A device for communicating information to remote locations, the device comprising:
- a processor;
- a memory;
- a display;
- a communication component that allows said device to communicate with locations remote from said device;
- an input mechanism that allows a user to interact with said device, through which said user enters a query, and through which results to said query, obtained from a service remote to said device, are presented to said user; and
- a message authoring component that receives, from said user, an indication that said user wants to author a message based on information that is displayed on said display, said information comprising said results, that creates a proposed message based on said information wherein said proposed message comprises a noun and a first verb, that presents, to said user through said display, a first interface which allows said user to select a second verb to replace said first verb, said second verb being distinct from said first verb, that receives said user's selection of said second verb and creates a modified message that contains text from said proposed message but with said second verb in place of said first verb, that derives from said results and from information that exists on said device a plurality of phrases, that presents, to said user, a second interface that allows said user to select, for inclusion in said modified message, a first one of said plurality of phrases, that includes said first one of said plurality of phrases and a link to one of said results in said modified message, and that communicates said modified message to a remote location through said communication component.

7. The device of claim 6, wherein said input mechanism comprises a touch screen, and wherein said indication that said user wants to author a message comprises said user's having touched said touch screen near content on which said proposed message is based.

8. The device of claim 6, wherein said message authoring component receives, from said user, an indication of a channel over which said user wants to transmit said modified message, and wherein said device uses said communication component to transmit said modified message over said channel.

* * * * *